Benedict Cassen
Irving Ross
Inventors

June 23, 1964     B. CASSEN ETAL     3,138,709
GAMMA RAY SCINTILLATION DETECTORS WITH LIGHT
CONDUCTING RODS FOR REACTOR HOT SPOTS
Filed March 19, 1956     2 Sheets-Sheet 2
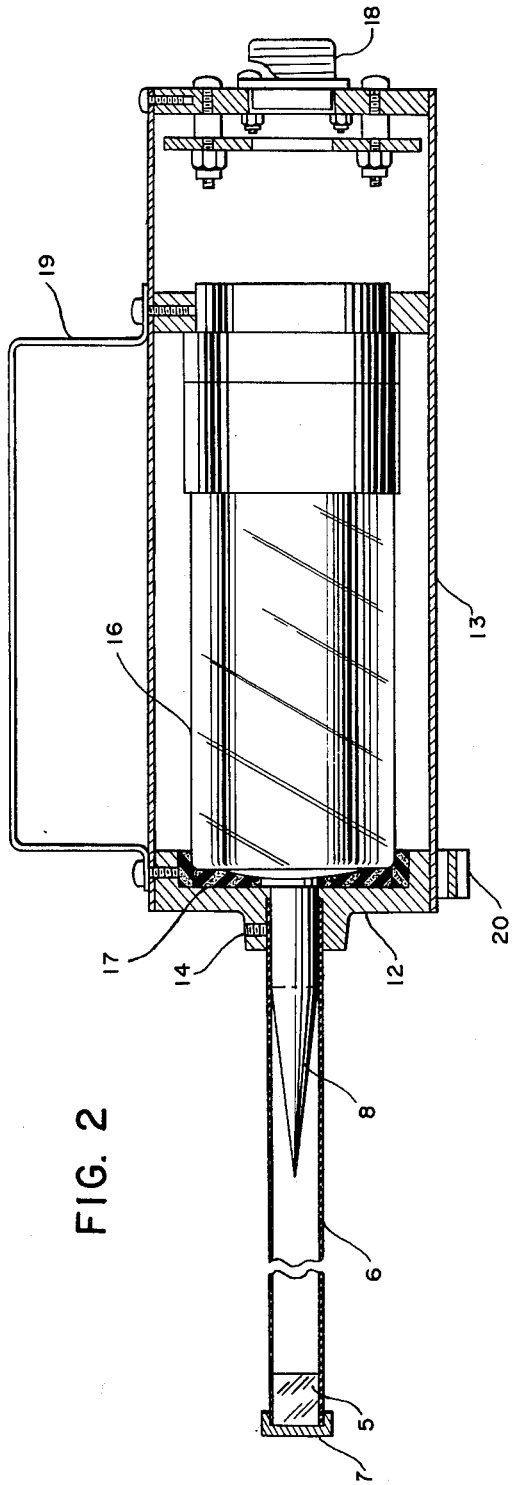
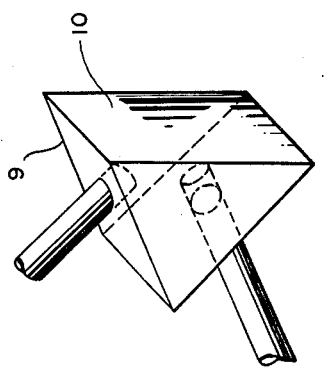
Benedict Cassen
Irving Ross
INVENTORS
BY
ATTORNEY United States Patent Office 3,138,709
Patented June 23, 1964

3,138,709
GAMMA RAY SCINTILLATION DETECTORS WITH LIGHT CONDUCTING RODS FOR REACTOR HOT SPOTS
Benedict Cassen, Pacific Palisades, and Irving Ross, San Gabriel, Calif., assignors to Hycon Mfg. Company, Pasadena, Calif., a corporation of Delaware
Filed Mar. 19, 1956, Ser. No. 572,565
5 Claims. (Cl. 250—71.5)

This invention relates generally to radiation monitors and more particularly to a high level radiation monitor.

In order to obtain reasonably good thermodynamic efficiency in any type of power reactor, it is necessary to operate the fission fuel elements at as high a temperature as practicably possible without producing damage to them or the surrounding moderators, or structure. If operation is undertaken near the limiting allowable temperature, then great damage could occur if only one spot in the reactor should exceed the limiting temperature.

A local region operating at a higher than permissible temperature for the operating level of a reactor is referred to as a "hot spot." A hot spot could conceivably develop from small variations in local neutron trapping impurities in a fuel plate, variations in heat transfer caused by small deposits or corrosion effects on heat transfer surfaces, non-uniformity in quality of the fissionable material, and many other effects. In many cases a hot spot may cause the complete shutdown of certain types of power reactors for long repair periods.

As it is essential in the nature of a reactor that a fast neutron flux exist in the neighborhood of the fissionable material, and since the central neutron flux is directly related to the temperature, among other things, it is necessary that any detecting element located nearby for measuring some local property of a reactor does not have its useful properties destroyed or modified by long exposures to fast neutrons and high temperatures. This in general is a much more stringent limitation than providing elements that will stand up to long exposures to intense gamma radiations. The fact that organic compounds are rapidly decomposed or modified by neutron exposure prevents extended use of any detecting device requiring electrical insulation and electrical leads, such as thermopiles.

It is an object of the present invention to provide means for a simple and reliable monitoring system that can quickly exhibit information of the formation of a hot spot in a reactor, for example.

Another object of the invention is to provide a detecting element in a radiation monitor which can stand up in high temperature to long exposures to fast neutrons and intense gamma radiations.

Another object of this invention is to provide a radiation monitor which can produce a substantially linear indication at high radiation levels.

A further object of the invention is to provide means having a very low neutron cross section and being durable in a reactor for transmitting information from a detecting element through the shielding.

Briefly, the foregoing and other objects are preferably accomplished by providing a plurality of pure fused silica detecting elements suitably disposed and positioned throughout a reactor core to give a three dimensional grid of points covering the core. These elements are luminescent at high levels of gamma radiation, for example, and the light production process is strictly linear for this material. An optical light pipe consisting of an internally reflecting tube made of a metal such as aluminum, for each element, mounts the element at an enclosed end of the pipe, which pipe is brought out through the reactor shielding by bending each pipe as necessary to prevent leakage of gamma radiation and neutrons in a straight channel through the shield. Reflecting periscope type fittings can be provided at sharp bends in the tubing.

The light from each luminescent element after being piped out of the reactor core and through the shield is detected with a radiation sensitive detector such as a photomultiplier tube and the output thereof is provided to amplifier means which is connected to control a center balanced, two position polarized relay, for example. This relay is actuated from the center balanced condition to one or the other contact positions depending upon the magnitude of the input signal to the amplifier means. A red and an amber indicator lamp can be connected to the two relay contact positions, respectively, so that when the red lamp lights, it indicates the potential formation of a hot spot at this point, and when the amber lamp lights, it indicates the temperature at this point is operated too low. Thus, a visual display of the uniformity of reactivity throughout the reactor core can be provided by a plurality of indicator lamp pairs.

The invention possesses other objects and features, some of which together with the foregoing will be set forth in the following detailed description of a preferred embodiment of the invention, and the invention will be more fully understood by reading the description with joint reference to the accompanying drawings, in which:

FIGURE 2 is a cross sectional view of a radiation monitor unit including a detecting element, light pipe and photomultiplier tube;

FIGURE 3 is a drawing showing a pill box type of periscope fitting for sharp bends of the light pipe; and FIGURE 4 is a perspective of a conical light collecting member for gathering light to the photomultiplier tube.

Figure 1:
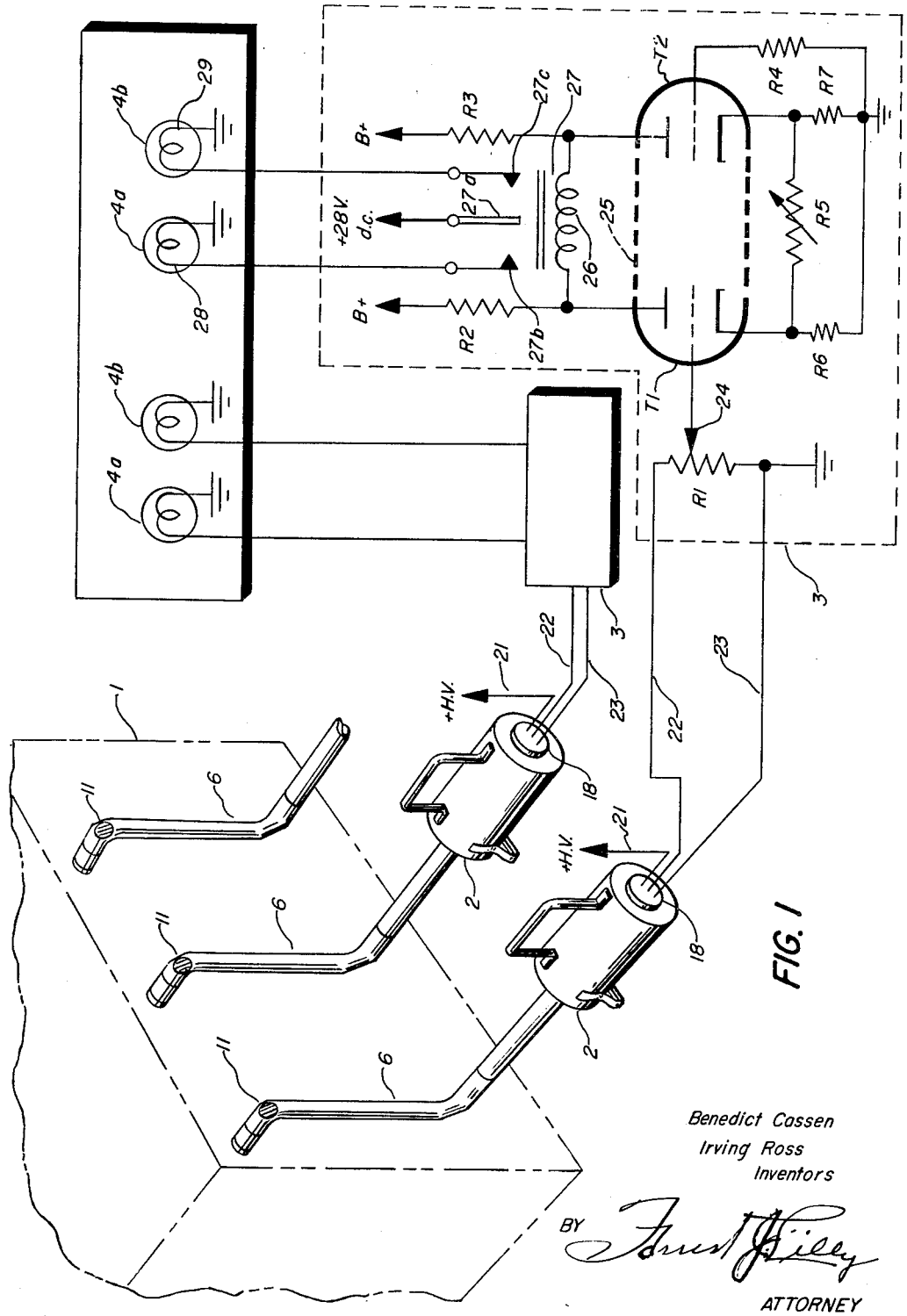
FIGURE 1 is a combination perspective and schematic drawing illustrating a preferred embodiment of the invention.

Referring first to FIGURE 1, a preferred embodiment of a high level radiation monitoring system is shown. A reactor 1, for example, provides a source of high level radiation which is to be monitored by a plurality of detector units 2. The output of these units are connected to electronic control circuits 3 which, in turn, govern the energization of a plurality of indicator lamps 4a and 4b.

Reference is made now to FIGURE 2 which is a detailed, cross sectional view of a detector unit 2. A cylindrical piece of pure fused silica 5 is mounted in the end of a long, drawn aluminum tubing 6. Sharp bends are not shown in this figure. The end of the tubing 6 is enclosed by an aluminum cap 7. Any other metal which has a very low neutron cross section and is durable in a reactor can be used instead of aluminum for tubing 6 and cap 7.

Pure fused silica is used for a detecting element because it has been discovered that it is not discolored by radiation and neutron exposure, and responds linearly to high energy gamma radiation. Other fluorescent or short life phosphorescent materials as the conventional phosphors cannot stand up for any length of time to fast neutrons and intense gamma radiations. The response of other luminescent materials is not linear to radiations of high energies.

The detecting element 5 converts the local reactor gamma radiation level into light since pure fused silica is luminescent to high energy (approximately .7 mev. and greater) gamma radiation on account of the Cerenkov effect. The visible light is due to high speed electrons produced in the pure fused silica by adsorption of the radiation. Alpha and beta particles are absorbed by the aluminum surrounding the pure fused silica element 5. This light is conducted through tubing 6 and is gathered by a conically pointed Lucite member 8, for example. The tubing 6 can be slightly bent or it can be sharply bent when suitable reflecting means are provided at the bends.

FIGURE 3 illustrates a means for accomplishing very sharp bends of the tubing 6. A triangular pill box structure 9 connects the separated ends of the tubing 6, the inside surface of the back panel 10 being highly polished to provide a reflecting surface. Of course, when the tubing 6 is not separated at these sharp bends, a reflecting disc 11 (FIGURE 1) must be affixed at the bend through a cut which is properly located. The tubing 6 is six feet long or more, and can be a half inch in diameter, for example.

The other end of the tubing 6 is secured to an end plate 12 of housing 13 and is held in place by set screw 14, the tubing 6 enclosing the light gathering member 8 as shown.

FIGURE 4 is a perspective of the conically shaped member 8. The member 8 is preferably fabricated from a Lucite rod which is sharpened conically to a point on one end and provided with a flange 15 at the other end. The flange 15 provides a shoulder against which the inside surface of plate 12 is pressed by the top of a photomultiplier tube 16. The flange end surface is concave to accept close and intimate contact with the slightly convex top center of tube 16. A spongy ring gasket 17 cushions the tube 16 from end plate 12.

The output terminals of the photomultiplier tube 16 are wired (not shown in FIGURE 2) to electrical receptacle 18 which connects with one of the control circuits 3. The housing 13 is provided with a handle 19 and also a base rest 20.

Referring again to FIGURE 1, the tubing 6 or light pipes are shown having two right angle bends to pass through the reactor shielding and to properly position the detecting elements in the tubing ends in the core. Cutouts at the bends are provided in which the reflecting discs 11 are welded in place. At the receptacle 18, three leads are shown connected therewith. One lead 21 is indicated as leading to a source of high voltage, H.V., which is a well regulated high voltage supply for the photomultiplier tubes 16. The other two leads 22 and 23 are connected across a resistor R1, lead 23 being additionally grounded as shown.

An adjustable tap 24 on resistor R1 is directly connected to the control grid of triode T1 of a twin triode tube 25. The anode of T1 is connected to a plate supply voltage B+ through plate resistor R2. Similarly, the anode of triode T2 is connected to B+ through plate resistor R3, but the control grid of T2 is, however, grounded through resistor R4. The values selected for R2 and R3 are such that a relay zero balance condition is obtained for a certain optimum operating temperature. The cathodes of T1 and T2 are connected together by adjustable resistor R5 and are respectively grounded through cathode resistors R6 and R7, as shown.

The control coil 26 of a center balanced, two position polarized relay 27 is connected between the two anodes of triodes T1 and T2 and the armature 27a thereof is connected to a 28 volt supply, for example. Contact 27b is connected to ground through the filament 28 of an indicator lamp 4a which can be red, for example, and contact 27c is connected to ground through the filament 29 of another indicator lamp 4b which can be amber.

Thus, the voltage appearing on the grid of T1 varies in accordance with the light intensity of the pure fused silica detecting element as transmitted through tubing 6 and converted into an electrical signal by photomultiplier 16. Temperature of the reactor is due to many things (including neutron flux) which constitute the activity of the reactor. Temperature (matter in motion) for any spot, as is the gamma radiation level which is actually monitored, is a function of the local reactor activity at that point. Since the light output response of pure fused silica is substantially linear to the high intensity gamma radiation for a point in the core, the voltage on the grid of T1 is a measure of the core temperature at that point.

The values of R2 and R3 are such that for a given input voltage (temperature), the triodes T1 and T2 draw currents such that no current flows in the control coil of relay 27 and the armature 27a remains in a center balanced position. The values of resistors R2 and R3 are preferably chosen equal for obtaining substantially equal tube currents and can be selected by the use of an exterior calibrating source. The detecting element 5 can be inserted into a standard reactor such as a Materials Test Reactor, or where correct temperature and corresponding radiation (activity) are known, then for particular values of resistors R5, R6 and R7, the load resistors R2 and R3 are conventionally chosen for proper dissipation with no current flowing in the control coil 26. Zero balance can be similarly obtained by using unequal values of R2 and R3 with unequal tube currents resulting at the given input voltage, however. Of course, R2 and R3 can be replaced with a single resistor having an adjustable tap connected to the plate supply. When the input voltage rises, T1 draws more current and current can flow in the control coil causing armature 27a to make with contact 27b thereby energizing lamp filament 28 indicating that the temperature or radiation level is too high for a point in the reactor. When the input voltage drops from the given input voltage, T2 draws more current and current can flow in the relay control winding 26 causing armature 27a to make with contact 27c thereby energizing lamp filament 29 indicating that the temperature is below the allowable temperature for a point in the reactor. Resistor R5 can be adjusted to vary the gain.

The information thus provided can enable either automatic or manual corrective measures to be taken. A control of the overall uniformity of a reactor can produce more efficient use of the fuel elements so that less frequent recharging is necessary and full power output is continuously maintained.

It is noted that triode T2 can be deleted, coil 26 being connected to a suitable negative bias instead of to the anode of T2. This does not provide a drift compensated control unit 3 but is entirely satisfactory for general use.

It will be apparent from the above description there is thus provided a device of the character described possessing the particular features of advantage before enumerated as desirable, but which obviously is susceptible of modification in its form, proportions, detailed construction and arrangement of parts without departing from the principles involved or sacrificing any of its advantages.

In order to comply with the statute, the invention has been described in language more or less specific as to structural features. It is to be understood, however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A radiation monitor comprising: an extremely pure fused silica detecting element durable in a reactor adapted to receive high-level gamma radiation and responsive thereto for producing visible light in accordance therewith; means having a relatively low neutron cross section and durable in a reactor, connected to said detecting element for transmitting said visible light to a point spaced distantly from said detecting element; means including a photosensitive element illuminable by the transmitted light from said detecting element and responsive to said transmitted light for producing electrical signals in accordance therewith; and indicating means electrically coupled to said electrical signal producing means for signalling the intensity of said radiation.

2. A radiation monitor according to claim 1 in which said detecting element is shielded from incident radiation by opaque means for absorbing alpha and beta radiation.

3. A radiation monitor according to claim 1 in which said indicating means comprises a center balanced, two position polarized relay having an actuating coil, an armature, and first and second position contacts; and control means connecting said photosensitive element to said polarized relay for actuating said relay armature from center balanced position to said first contact position in response to a relatively large electrical signal and to said second contact position in response to a relatively small electrical signal.

4. A radiation monitor according to claim 1 in which said transmitting means comprises a length of aluminum tubing enclosing said detecting element at one end and connecting with said photosensitive element at the other end, said tubing having sharp bends therein, and including reflecting means positioned at said bends to reflect the transmitted light through said tubing.

5. A radiation monitor according to claim 4 in which said tubing is connected to said photosensitive element by a light gathering member comprising a conical transparent plastic member having a concave base adapted to contact the surface of said photosensitive element.

References Cited in the file of this patent

UNITED STATES PATENTS

| 2,558,919 | Zinn | July 3, 1951 |
| 2,666,857 | McLaren et al. | Jan. 19, 1954 |
| 2,727,154 | Goldsworthy | Dec. 13, 1955 |
| 2,739,242 | Armistead | Mar. 20, 1956 |
| 2,821,633 | Friedman | Jan. 28, 1958 |
| 2,923,824 | Martin et al. | Feb. 2, 1960 |

OTHER REFERENCES

Morey: "Properties of Glass," Rheinhold Publishing Company, 1954 (pages 74, 371 and 436 relied on).